United States Patent
Hibi et al.

(10) Patent No.: US 6,390,946 B1
(45) Date of Patent: May 21, 2002

(54) TOROIDAL TYPE AUTOMATIC TRANSMISSION FOR MOTOR VEHICLES

(75) Inventors: Toshifumi Hibi; Haruhito Mori; Masaki Nakano, all of Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/355,108

(22) PCT Filed: Aug. 4, 1998

(86) PCT No.: PCT/JP98/03475

§ 371 Date: Jun. 9, 2000

§ 102(e) Date: Jun. 9, 2000

(87) PCT Pub. No.: WO99/08024

PCT Pub. Date: Feb. 18, 1999

(30) Foreign Application Priority Data

Aug. 8, 1997 (JP) ............................................. 9-214235

(51) Int. Cl.⁷ .............................................. F16H 37/02
(52) U.S. Cl. ....................................................... 475/216
(58) Field of Search ................................ 475/214, 215, 475/216

(56) References Cited

U.S. PATENT DOCUMENTS

| 5,368,530 A | | 11/1994 | Sanematsu et al. ............ 477/43 |
| 5,846,155 A | * | 12/1998 | Taniguchi et al. .............. 477/2 |
| 5,871,417 A | * | 2/1999 | Suzuki ......................... 477/37 |
| 5,885,185 A | * | 3/1999 | Kidokoro et al. .............. 476/10 |
| 6,019,700 A | * | 2/2000 | Imai et al. ..................... 477/45 |
| 6,244,986 B1 | * | 6/2001 | Mori et al. ..................... 477/46 |
| 6,254,504 B1 | * | 7/2001 | Goi et al. .................... 475/216 |

FOREIGN PATENT DOCUMENTS

| EP | 0 044 202 | 1/1982 |
| EP | 0 373 649 | 6/1990 |
| JP | 2-163562 | 6/1990 |

* cited by examiner

*Primary Examiner*—Sherry Estremsky
(74) *Attorney, Agent, or Firm*—Foley & Lardner

(57) ABSTRACT

Even in the case where a driver switches a select lever from D range to N range and returns it back to D range during the running of a vehicle, a speed change control device prevents the operation of sudden speed change caused by a difference between a transmission input rotational speed and the actual input rotating speed of a toroidal transmission unit while in the N range. Accordingly, an automatic transmission comprises a forward-reverse switching mechanism, an impelling mechanism and a toroidal transmission unit which are sequentially arranged from the driving source side of a vehicle, and further comprises a speed change control device for controlling the operation of the above. A notch as a rotational speed signaling section is provided on the outer periphery of a loading cam, for example, among rotating members in the area from an output member of the above forward-reverse switching mechanism to an input disc of the above toroidal transmission unit, and the notch is detected by a rotation sensor arranged in the vicinity of the outer periphery to detect the rotational speed of the loading cam and input the same to the speed change control device.

6 Claims, 3 Drawing Sheets

TOROIDAL TYPE AUTOMATIC TRANSMISSION FOR MOTOR VEHICLES

FIELD OF THE INVENTION

The present invention relates to an automatic transmission for a vehicle. It particularly relates to the automatic transmission comprising a toroidal-type continuously variable transmission including a torque converter, a forward-reverse switching mechanism, a impelling mechanism and a toroidal transmission unit which are sequentially provided from the driving source (engine) end of a vehicle, and further comprising a speed change control device for controlling speed change ratio and forward-reverse switching.

BACKGROUND OF THE INVENTION

A toroidal type continuously variable transmission as an automatic transmission for a vehicle is described in JP-A-2-163562. This toroidal type continuously variable transmission has two toroidal transmission units in tandem, and is provided with a forward-reverse switching mechanism disposed on the preceding stage side of the toroidal transmission units.

In order to control the speed change ratio of the toroidal type continuously variable transmission, the above speed change control device obtains the ratio of the input rotational speed of the transmission as detected by a rotating speed sensor, to the output rotational speed, and changes the tilting angle of a power roller of the toroidal transmission unit according to the engine load, the vehicle speed and so on when the automobile is in motion to change the ratio of the output rotation to the input rotation, that is, the speed change ratio.

In such circumstances, the sensor for the input rotational speed of the transmission detects the output rotational speed of the torque converter. Accordingly, there is a difference between the transmission input rotational speed which the sensor inputs into the speed change control device for speed change control and the actual input rotational speed of the toroidal transmission unit.

However, the sensor for detecting the input rotational speed sometimes can not accurately detect said speed of the transmission under certain conditions.

When a driver switches the operating lever of the continuously variable transmission, from a drive range (D range) to a neutral range (N range) that is to say, puts the automobile in neutral during running, the forward-reverse switching mechanism becomes free in the N range, so that the rotation is not transmitted from the output shaft of the torque converter to the input shaft of the toroidal transmission unit. Accordingly, though the rotation of the output shaft of the torque converter corresponds to the engine rotational speed, the input shaft rotational speed of the toroidal transmission unit depends on the rotation of the output shaft at that time. Therefore it corresponds to the rotational speed corresponding to the vehicle speed and the speed change ratio.

In such cercumstances, the sensor for the input rotational speed of the transmission detects the output rotational speed of the torque converter. Accordingly, there is a difference between the transmission input rotational speed which the sensor inputs into the speed change control device for speed change control and the actual input rotational speed of the toroidal transmission unit.

When the driver switches the select lever again from N range back to D range ie. puts the automobile back into drive, in such a running condition that an input rotational speed difference results, the speed change control device determines the speed change ratio according to the input rotational speed when in the N range, which is different from the actual input shaft rotational speed of the toroidal transmission unit immediately after the above switching.

Therefore the transmission applies a speed change ratio determined according to rotational speed data different from the actual input rotational speed. Therefore the toroidal transmission unit is forced to conduct a sudden speed change operation, which results in the disadvantage that a comparatively large speed change shock is produced.

A methods for overcoming this disadvantage, is to dispose the forward-reverse switching mechanism not on the preceding stage side (input side) of the toroidal transmission unit, but to the subsequent stage side in order to connect the output side of the torque converter and the input side of the toroidal transmission unit to each other. As a result, the input rotational speed detected by the sensor always corresponds to the input shaft rotational speed of the toroidal transmission unit.

However, as the arrangement of the forward-reverse switching mechanism is changed in such a way, during normal running, the large torque rotation decelerated by the toroidal transmission unit is always applied to the forward clutch in the forward-reverse switching mechanism and reverse brake. These members need to have high durability, which results in the disadvantage that it is necessary to increase their capacity and the size.

It is, accordingly, an object of the present invention to prevent a speed change shock by always accurately detecting the actual input shaft rotational speed of the toroidal transmission unit and conducting speed change control according to this accurate detected rotational speed.

It is another object of the present invention to accurately detect the input rotational speed of the toroidal transmission unit without changing the arrangement of the forward-reverse switching mechanism to the subsequent stage side of the toroidal transmission unit.

SUMMARY OF THE INVENTION

In order to achieve the foregoing objects, the automatic transmission for a vehicle of the present invention comprises a toroidal type continuously variable transmission including a forward-reverse switching mechanism, an impelling mechanism and a toroidal transmission unit which are sequentially provided from the driving source end of the vehicle, and a speed change control device for controlling the operation of the transmission. A rotational speed signalling section is provided on one of the rotating members, which are connected to each other in the area from the output member of the forward-reverse switching mechanism to the input disc of the toroidal transmission unit, regardless of presence or absence of rotation transmission in the forward-reverse switching mechanism, an input rotational speed detecting part fitted to the transmission case side is positioned in the vicinity of the outer periphery of said rotational speed signalling section, and the input rotational speed detecting part detects the rotational speed of the rotating member provided with the rotational speed signalling section to be input to the speed change control device.

In the toroidal type continuously variable transmission for a vehicle of the present invention, even in the case where a driver switches the select lever of the automatic transmission from D range to N range during the running of a vehicle and the rotation is not transmitted to the forward-reverse switching mechanism, the rotational speed of one of the rotating members in the area from the output member of the forward-reverse switching mechanism to the input disc of the toroidal transmission unit, that is, the rotational speed which agrees with the input shaft rotational speed of the toroidal transmission unit is detected by the input rotational speed detecting part to be input to the speed change control device. Therefore the actual rotational speed input to the toroidal transmission unit, which is always detected accurately, continues to be input to the speed change control device while driving in the N range.

Accordingly, even if the driver switches the select lever of the automatic transmission from N range back to D range, the speed change control device controls the forward-reverse switching mechanism to transmit the rotation, controls the speed change ratio of the toroidal transmission unit on the basis of the actual input rotational rotating speed of the toroidal transmission unit while in the N range. Therefore the toroidal transmission unit is kept from performing sudden speed change operation and no speed change shock results.

In the present invention, the rotating member provided with the rotational speed signalling section is a loading cam in the impelling mechanism, and the rotational speed signalling sector may be provided on the outer peripheral part of the loading cam. The loading cam of the impelling mechanism, to which the output rotation of the forward and reverse switching mechanism is input, transmits the rotation to the input disc of the toroidal transmission unit through a cam roller and rotates substantially in unison with the input disc. Therefore the outer peripheral part of the loading cam expresses the maximum peripheral speed of the loading cam. The pitch of the signal section can be made smaller, so that the actual input rotational speed of the toroidal transmission unit can be detected accurately.

Further, in the present invention, the rotating member provided with the rotational speed signalling section may be a cam roller holder in the impelling mechanism, and the rotational speed detecting part may be provided on the outer peripheral part of the cam roller holder. The cam roller holder of the impelling mechanism is also rotated substantially in unison with the cam roller. Subsequently, the input disc also rotates when the loading cam transmits the output rotation of the forward-reverse switching mechanism through the cam roller to the input disc of the toroidal transmission unit, so that the actual input rotational speed of the toroidal transmission unit can be detected accurately.

Further, in the present invention, when the rotational speed detecting part is provided on the outer peripheral part of the cam roller holder, the loading cam of the impelling mechanism may have a smaller diameter than the cam roller holder of the impelling mechanism, and an outer peripheral part provided with the rotational speed signalling section of the cam roller holder may be formed in such a manner as to be extended in the axial direction, surrounding the outer peripheral part of the loading cam. The cam roller holder moves a little in the axial direction of the cam roller when the loading cam presses on the input disc through the cam roller with a force corresponding to transmission torque moving the input disc toward the output disc. Therefore if the outer peripheral part provided with the rotational speed signalling section of the cam roller holder is formed in such a manner as to be extended in the axial direction as described above, even if the cam roller holder moves in the axial direction, the input rotational speed detecting part can always detect the rotational speed of the rotational speed signalling section of the cam roller holder accurately. If the outer peripheral part of the cam roller holder is extended in the axial direction, as described above, and the loading cam is formed in such a manner as to have a smaller diameter than the cam roller holder and the outer peripheral part of the loading cam is surrounded with the outer peripheral part of the cam roller holder, the outer peripheral part of the cam roller holder can be extended in the axial direction without any increase in the radial dimension of the cam roller holder so as to eliminate the need of increasing the radial dimension of the toroidal type continuously variable transmission.

Further, in the present invention, the cam roller holder may have a smaller diameter than the input disc of the toroidal transmission unit. In such a configuration, the radial dimension of the cam roller holder will not be larger than the radial dimension of the input disc so as to eliminate the need of increasing the radial dimension of the toroidal type continuously variable transmission.

Further, in the present invention, a rotating member provided with the rotational speed signalling section may be an input disc of the toroidal transmission unit. The rotational speed signalling section may be provided on the outer peripheral part of the input disc, and the rotating member provided with the rotational speed signalling section may be also the output member of the forward-reverse switching mechanism. For detecting the actual input rotational speed of the toroidal transmission unit, it is desirable to detect the rotational speed of the input disc, so that if there is spatial room in the periphery of the input disc, and strengthening margins are provided in the input disc, the rotational speed signalling section may be provided on the outer peripheral part of the input disc.

Further, as an output member such as a pinion carrier or the like is the forward-reverse switching mechanism is always rotated substantially in unison with the input disc, the rotational speed signalling section may be provided on the output member.

DESCRIPTION OF THE PREFERRED EMBODIMENTS

Preferred embodiments of the present invention will now be described with reference to the attached drawings.

Figure 1:
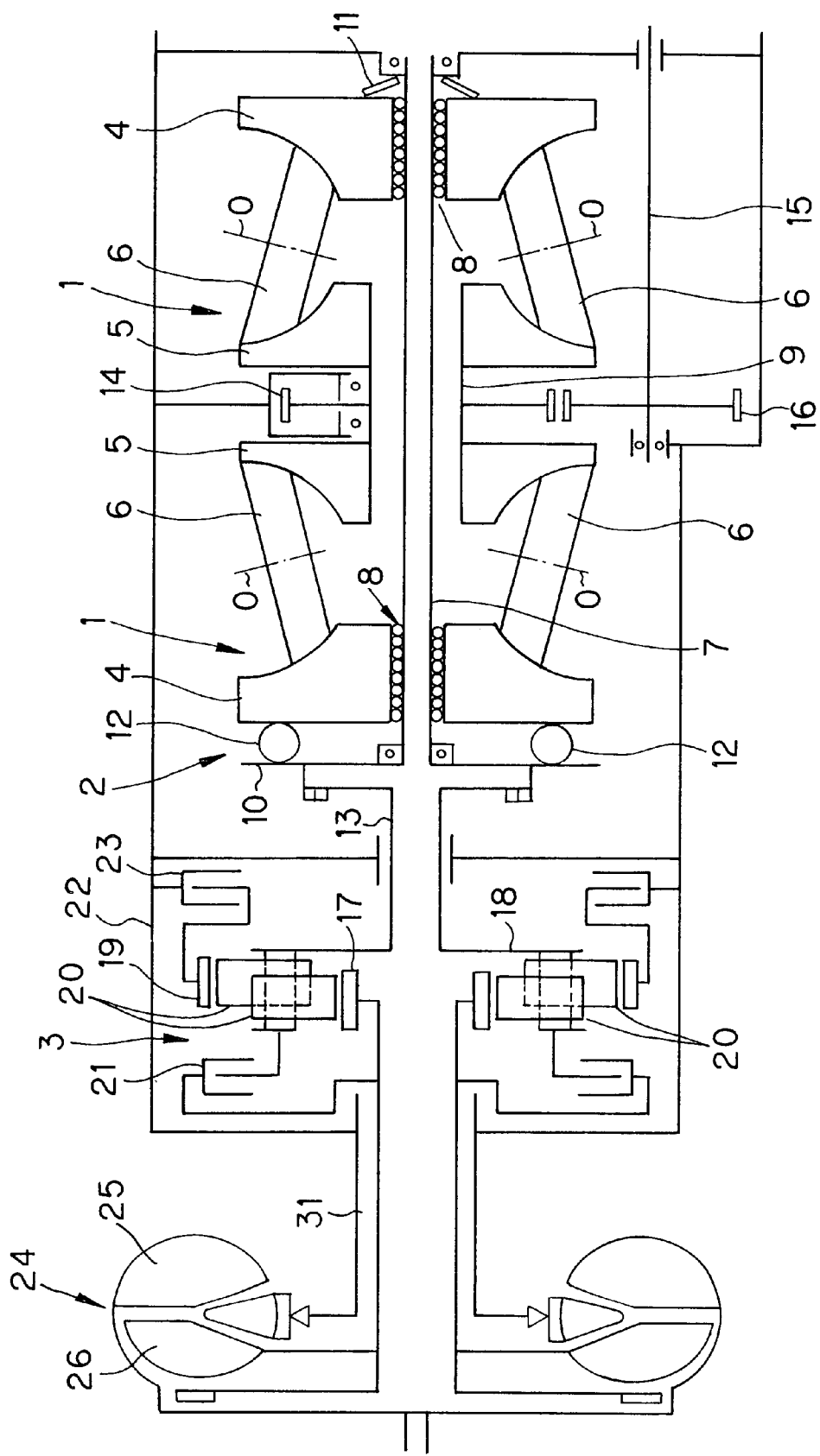
FIG. 1 is a skeleton diagram showing the construction of a toroidal type continuously variable transmission for a vehicle according to the present invention.

As shown in FIG. 1 a toroidal type continuously variable transmission for a vehicle is, so constructed that two toroidal transmission units 1 are arranged in tandem, an impelling mechanism 2 is provided at a preceding stage (input side) to the toroidal transmission unit 1, and a forward-reverse switching mechanism 3 is provided at the preceding stage to the impelling mechanism 2.

Each toroidal transmission unit 1 includes coaxially-arranged input and output discs 4, 5, and a pair of power rollers 6 clamped between the input and output discs to transmit power by frictional contact. The tilting angle of the power roller 6 is changed by a driving mechanism (not shown).

Two toroidal transmission units 1 are arranged back to back, and their respective input discs 4 are connected to each other in such a manner as to respectively engage with the torque transmission shaft 7 in the rotating direction through a ball spline mechanism 8 and slide in the axial direction. A pair of output discs 5 arranged back to back to the two toroidal transmission units 1 are connected to each other through an output shaft 9.

Accordingly, when the input disc 4 is rotated, the power roller 6 is rotated so that the output disc 5 coming into contact with the roller 6 is rotated, and the transmission ratio of the rotation varies with the titling angle of the power roller 6.

The impelling mechanism 2 is adapted to ensure the frictional contact among the respective input and output discs 4,5 and the power roller 6 of two toroidal transmission units 1. A loading cam 10 is arranged on one end part of the torque transmission shaft 7 and a disc spring 11 is arranged on the other end part thereof in such a manner as to be positioned outside the respective input discs 4 of two toroidal transmission units 1. A cam roller 12 installed by a disc-like cam roller holder mentioned later and is provided between the loading cam 10 and the back face of the input disc 4 of the toroidal transmission unit 1 adjacent thereto, which is on the left side of the drawing.

An input shaft 13 is connected to the loading cam 10 to be connected to the forward-reverse switching mechanism 3.

A countershaft 15 is arranged parallel to the output shaft 9, and an output gear 14 provided on the output shaft 9 and a counter gear 16 provided on the countershaft 15 mesh with each other so that the rotation of the output shaft 9 is transmitted to the countershaft 15. The countershaft 15 transmits the rotation to a driving wheel (not shown) through a power transmission system (not shown) such as a differential gear mechanism for a vehicle or the like.

The forward-reverse switching mechanism 3 includes a planetary gear mechanism. It has a sun gear 17, a pinion carrier 18 connected to the input shaft 13, an internal gear 19, and pinions 20 rotatably supported in pairs on the pinion carrier 18, one of which meshes with the sun gear 17, the other meshing with the internal gear 19, two forming a pair meshing with each other. A forward clutch 21 is interposed between the sun gear 17 (a turbine shaft 31 to which the sun gear 17 is connected) and the pinion carrier 18, a reverse brake 23 is interposed between the internal gear 19 and a transmission case 22, and the forward clutch 21 and the reverse brake 23 are controlled to be selectively engaged.

A torque converter 24 is arranged between the forward-reverse switching mechanism 3 and an engine (not shown) as a driving source of a vehicle, the pump housing 25 side of the torque converter 24 is joined to the output shaft of the engine, and the sun gear 17 of the forward-reverse switching mechanism 3 is joined to the turbine shaft 31 connected to a turbine 26 of the torque converter 24.

In the toroidal type continuously variable transmission, the output rotation of the engine is transmitted to the forward-reverse switching mechanism 3 through the torque converter 24. In the forward-reverse switching mechanism 3, when the forward clutch 21 is in the engagement state (the reverse brake 23 is released), the sun gear 17 and the pinion carrier 18 are joined to each other by the forward clutch 21 to transmit the rotation from the torque converter 24 intact as forward rotation to the input shaft 13. On the other hand, when the reverse brake 23 is in the engagement state (the forward clutch 21 is released), the internal gear 19 is fixed to the transmission case 22 by the reverse brake 23, the sun gear 17, the internal gear 19 and the pinion 20 function as a planetary gear set, as a result, the rotation from the torque converter 24 is reversed and transmitted as backward rotation to the input shaft 13.

The rotation of the input shaft 13 is transmitted from the loading cam 10 through the cam roller 12 to the input disc 4 of the toroidal transmission unit 1 adjacent thereto on the left side in the drawing from the back face thereof. At this time, the loading cam 10 is turned in a small-degree arc relative to the input disc 4 depending on the transmission torque, whereby the cam roller 12 is pushed to displace the input disc 4 in the axial direction in some measure. The axial displacement increases the frictional force of the power roller 6 clamped between the input disc 4 and the output disc 5.

The rotation of the input disc 4 is transmitted through a ball spline structure 8 to the torque transmission shaft 7 and further transmitted through the ball spline structure 8 to another input disc 4 of the toroidal transmission unit 1 on the right side in the drawing. By the rotation of the input discs 4 of each toroidal transmission unit 1, the power roller 6 coming into frictional contact therewith is rotated around the central axis O, and the rotation is transmitted to the output disc 5 coming into contact therewith and further transmitted to the output shaft 9.

The rotation of the output shaft 9 is transmitted through the output gear 14 and the counter gear 16 meshing with each other to the countershaft 15 and then transmitted through the described power transmission system of the vehicle to the driving wheels to drive the vehicle forward and backward.

On the other hand, the power rollers 6 of the toroidal transmission unit 1 of the right and left are rotated in synchronization with each other with a gradient in the direction intersecting perpendicularly to the axis, the radial positions of the contact parts of the input and output discs 4,5 with the power rollers 6 are changed. Therefore the rotation transmission ratio is changed with the result that the rotation of the input shaft 13 varies in a non-step fashion and is transmitted to the output shaft 9.

A speed change control device for controlling the speed change operation of the described toroidal type continuously variable transmission obtains the rotational speed ratio of the input shaft 13 to the output shaft 9 corresponding to the speed change ratio, that is to say, the input and output rotational speed ratio of the toroidal transmission unit 1 from the transmission input rotational speed which is the rotational speed of the input shaft 13 and the transmission output rotational speed detected by the sensor provided on the described transmission mechanism of the vehicle, to change the rotation speed to be transmitted to the output shaft 9 by changing the tilting angle of the power roller 6 according to the engine load, the vehicle speed and so on during running, and controls the input and output rotational speed ratio in a non-step fashion.

Accordingly, in the present invention, a rotational speed sensor for detecting the described transmission input rotational speed is installed on a rotating member in an area from the output member of the forward-reverse switching mechanism 3 to the input disc 4 of the toroidal transmission unit 1.

Figure 2:
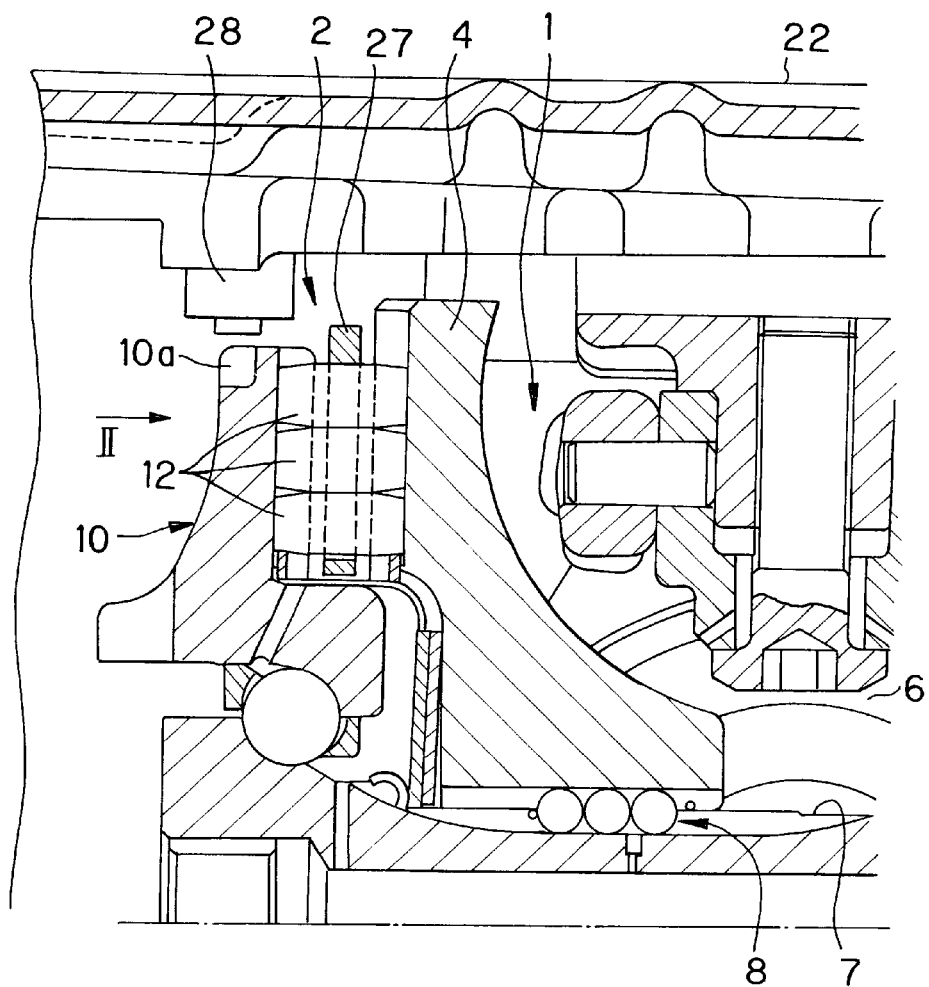
FIG. 2 is a sectional view showing the principal part of one embodiment of a toroidal type continuously variable transmission for a vehicle according to the present invention.

An actual example is shown in FIG. 2. The cam roller 12 is arranged in the state of being held by a disc-like cam roller holder 27 between the loading cam 10 and the input disc 4 of the toroidal transmission unit 1 adjacent thereto. The input shaft 13 of FIG. 1 is connected to the loading cam 10 to make the same rotation as the output rotation of the forward-reverse switching mechanism 3.

Figure 3:
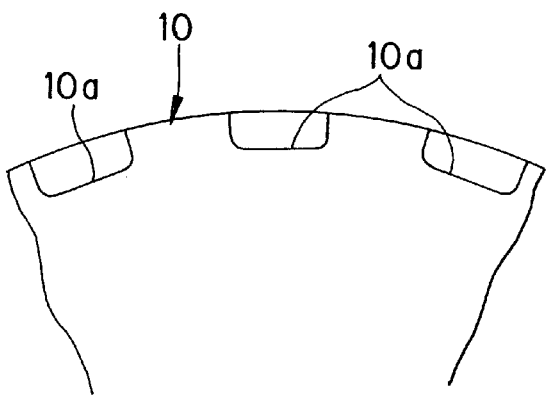
FIG. 3 is a front view of a loading cam of the above continuously variable transmission, taken in the direction of an arrow II of FIG. 2.

The outside diameter of the loading cam 10 is a little smaller than the outside diameter of the input disc 4, and the outer peripheral part of the loading cam 10 is, as shown in FIG. 3, provided with many notches 10a formed as a rotational speed signalling section at equal spaces in the circumferential direction.

On the other hand, a rotation sensor 28 functioning as an input rotational speed detecting part is fixed to the inside of the transmission case 22 to be opposite to the vicinity of the notch 10a in the outer peripheral part of the loading cam 10. The rotation sensor 28 detects the passing interval of the notches 10a in the outer peripheral part of the loading cam 10 which corresponds to the rotational speed of the loading cam 10 on the basis of changes in the magnetic flux, and inputs the detection signal into the speed change control device. Depending on the detection signal, the speed change control device uses the rotational speed of the loading cam 10, and, in its turn, to the actual input rotational speed of two toroidal transmission units 1 to control the speed change operation of the toroidal transmission units 1.

The loading cam 10 presses the input disc 4 via the cam roller 12, so that the reaction load is applied to the input disc 4 from the contact point with the power roller 6. As the contact point with the power roller 6 is positioned near the outer peripheral part of the input disc 4 when the power roller 6 is tilted to increase speed, it is not desirable to dispose the cam roller 12 too near the inner peripheral part of the input disc 4 because a large bending stress is generated in the input disc 4. Accordingly, in the present embodiment, the basis of there considerations, the cam roller 12 is arranged in the middle of the outer peripheral part and the inner peripheral part of the input disc 4, and the outside diameter of the loading cam 10 is made smaller than that of the input disc 4 so far as the loading cam can presses the cam roller 12.

In the toroidal type continuously variable transmission for a vehicle, even if a driver switches the select lever of an automatic transmission from D range to N range during the running of the vehicle so that rotation is not transmitted to the forward-reverse switching mechanism, the rotational speed of a rotating member, which is the loading cam 10 in the present embodiment, in the area from the pinion carrier 18 as the output member of the forward-reverse switching mechanism 3 to the input disc 4 of the toroidal transmission unit 1, which is joined to be driven regardless of presence or absence of a rotation transmission in the forward-reverse switching mechanism 3, is detected by the rotation sensor 28 to be input to the speed change control device.

The rotational speed of the loading cam 10 corresponds to the rotational speed of the output shaft of the toroidal transmission unit 1 and the speed change ratio at that time, and this is nothing but the actual input rotational speed of the toroidal transmission unit 1.

While at this stage, the engine rotational speed is transmitted to the torque converter 24, however, it is not transmitted to the input shaft 13 because the forward-reverse switching mechanism 3 is free.

Thus, the actual rotational speed input to the toroidal transmission unit 1, which is always detected accurately, continues to be input to the speed change control device even while in the N range.

Accordingly, even after that, if the driver switches the select lever of the automatic transmission from N range back to D range, the speed change control device controls the forward-reverse switching mechanism 3 to transmit the rotation and on the other hand, controls the speed change operation of the toroidal transmission unit 1 on the basis of the actual input rotational speed of the toroidal transmission unit 1 while in the N range, so that the toroidal transmission unit 1 is kept from ordering a sudden speed change operation.

According to the present embodiment, even in the case where the driver once switches the select lever of the automatic transmission from D range to N range during running of the vehicle, and returns it again to the D range, it is possible to effectively prevent the generation of a speed change shock caused by a difference between the transmission input rotational speed and the actual input rotational speed of the toroidal transmission unit 1 while in the N range. In this case, it is not necessary to change the arrangement of the forward-reverse switching mechanism from the preceding stage side of the toroidal transmission unit 1 to the subsequent stage side. It is also unnecessary to increase a forward clutch and a reverse brake of the forward-reverse switching mechanism in capacity and size.

The loading cam 10 of the impelling mechanism 2 is rotated substantially in unison with the input disc 4, and notches 10a as a rotational speed signalling section are provided on the outer peripheral part of the loading cam 10, whereby the pitch of the notches can be made smaller and the notches 10a are detected by the rotation sensor 28 so that the accuracy of detecting the actual input rotational speed of the toroidal transmission unit can be heightened.

Another embodiment will now be described by FIGS. 4 and 5.

Figure 4:
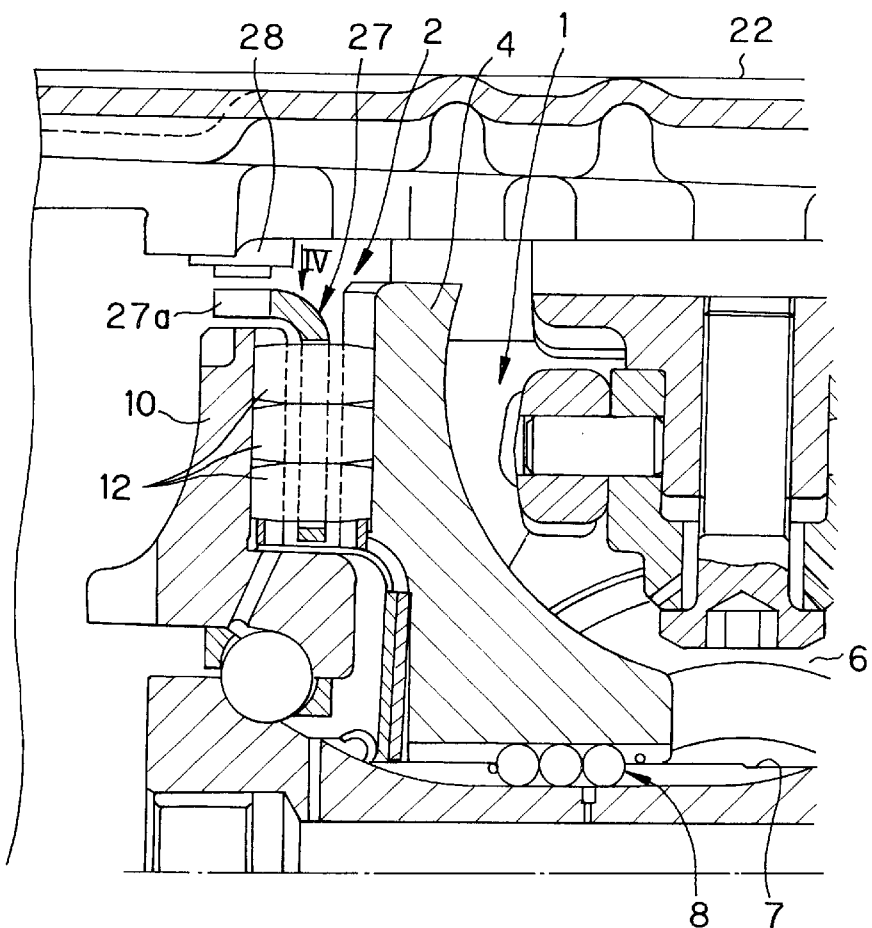
FIG. 4 is a sectional view showing the principal part of another embodiment of a toroidal type continuously variable transmission for a vehicle according to the present invention.

In the embodiment, as shown in FIG. 4, the outside diameter of the loading cam 10 is made smaller than the outside diameter of the input disc 4, the outside diameter of the cam roller holder 27 of the impelling mechanism 2 is made a little smaller than the outside diameter of the input disc 4, and further the tip part of the outer periphery of the cam roller holder 27 is bent at a right angle to be extended in the axial direction, surrounding the outer peripheral part of the loading cam 10.

Figure 5:
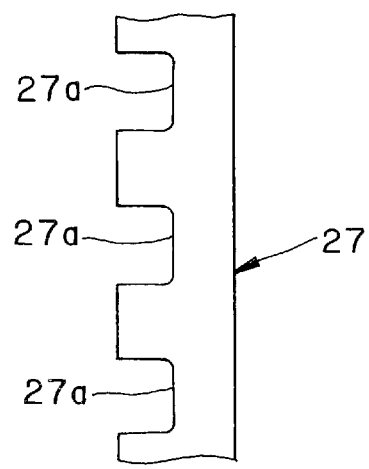
FIG. 5 is a plan view of a cam roller holder of the above continuously variable transmission, taken in the direction of an arrow IV of FIG. 3.

The axially extended cylindrical part is, as shown in FIG. 5, provided with many notches 27a as a rotational speed signalling section formed at equal spaces in the circumferential direction. The rotation sensor 28 functioning as an input rotational speed detecting part is fixed to the inside of the transmission case 22 to be opposite to the notch 27a of the outer peripheral part of the cam roller holder 27.

The rotation sensor 28 detects the passing interval of the notches 27a of the outer peripheral part of the cam roller holder 27 corresponding to the rotational speed of the cam roller holder 27 according to the change in magnetic flux, and inputs the detection signal to the speed change control device.

Accordingly, similarly to the described embodiment, the rotation sensor 28 can always detect the actual input rotational speed of the toroidal transmission unit 1 accurately.

When the loading cam 10 presses the input disc 4 through the cam roller 12 with an impelling force corresponding to the transmission torque moving the input disc 4 toward the output disc, the cam roller holder 27 is moved a little in the axial direction of the cam roller 12.

However, as the notches 27a are formed on the axially extended cylindrical part, even if the cam roller holder 27 moves a little in the axial direction, the rotation sensor 28 can always accurately detect the passing interval of the notches 27a of the cam roller holder 27, and in its turn, the rotational speed of the cam roller holder 27.

In extending the tip part of the cam roller holder 27 in the axial direction, as described above, the loading cam 10 has a smaller diameter than the cam roller holder 27 and the outer peripheral part of the loading cam 10 is surrounded with the tip part of the cam roller holder 27, so that it is not necessary to increase the diameter of the tip of the cam roller holder 27. Further, the cam roller holder 27 has a smaller diameter than the input disc 4, so that it is not necessary to increase the radial dimension of the toroidal type continuously variable transmission.

This invention is not limited to the described examples. For example, in order to detect the actual rotational speed of the toroidal transmission unit, it is desirable to detect the rotational speed of the input disc, so if there is spatial room in the periphery of the input disc, and strengthening margins are provided in the outer peripheral part of the input disc, the rotational speed signalling section may be provided on the outer peripheral part of the input disc. The output member such as a pinion carrier or the like of the forward-reverse switching mechanism is rotated substantially in unison with the input disc, so that the rotational speed signalling section may be provided on such an output member.

Other kinds of sensors may be used as an input rotational speed detecting part instead of the sensor of the described embodiment adapted to detect the passing interval of notches according to the change of magnetic flux, and though two toroidal transmission units are provided in tandem in the above embodiment, in the continuously variable transmission of this invention, it is sufficient to provide one toroidal transmission unit.

What is claimed is:

1. An automatic transmission for a vehicle, comprising:
   a toroidal type continuously variable transmission having a forward-reverse switching mechanism, an impelling mechanism and a toroidal transmission unit which are sequentially provided from the driving source side of the vehicle; and
   a speed change control device for controlling the operation of said transmission,
   wherein said impelling mechanism comprises a loading cam and a cam roller holder,
   wherein a rotational speed signaling section is provided on one of rotating members, which are connected to each other, in the area from an output member of said forward-reverse switching mechanism to said cam roller holder of said impelling mechanism, said one of rotating members rotating regardless of the presence or absence of the rotation transmission in said forward-reverse switching mechanism, and
   wherein an input rotational speed detecting part, installed on a side of a case of the transmission, is positioned in the vicinity of an outer periphery of said rotational speed signaling section, said input rotational speed detecting part detects a rotational speed of said one of rotating members provided with said rotational speed signaling section and inputs the detected rotational speed to said speed change control device.

2. The automatic transmission for a vehicle as claimed in claim 1, wherein said rotating member provided with said rotational speed signaling section is said loading cam of said impelling mechanism, and said rotational speed signaling section is provided on the outer peripheral part of said loading cam.

3. The automatic transmission for a vehicle as claimed in claim 1, wherein said rotating member provided with said rotational speed signaling section is said cam roller holder of said impelling mechanism, and said rotational speed signaling section is provided on the outer peripheral part of said cam roller holder.

4. The automatic transmission for a vehicle as claimed in claim 3, wherein the diameter of said loading cam of said impelling mechanism is smaller than that of said cam roller holder of said impelling mechanism, and the outer peripheral part of said cam roller holder provided with said rotational speed signalling section is formed in such a manner as to be extended in the axial direction, surrounding the outer peripheral part of said loading cam.

5. The automatic transmission for a vehicle as claimed in claim 4, wherein the diameter of said cam roller holder is smaller than that of said input disc of said toroidal transmission unit.

6. The automatic transmission for a vehicle as claimed in claim 1, wherein said rotating member provided with said rotational speed signalling section is an output member of said forward-reverse switching mechanism.

* * * * *